June 14, 1932.  F. RIEBER  1,863,415
MAGNETOMETER
Filed Jan. 4, 1928
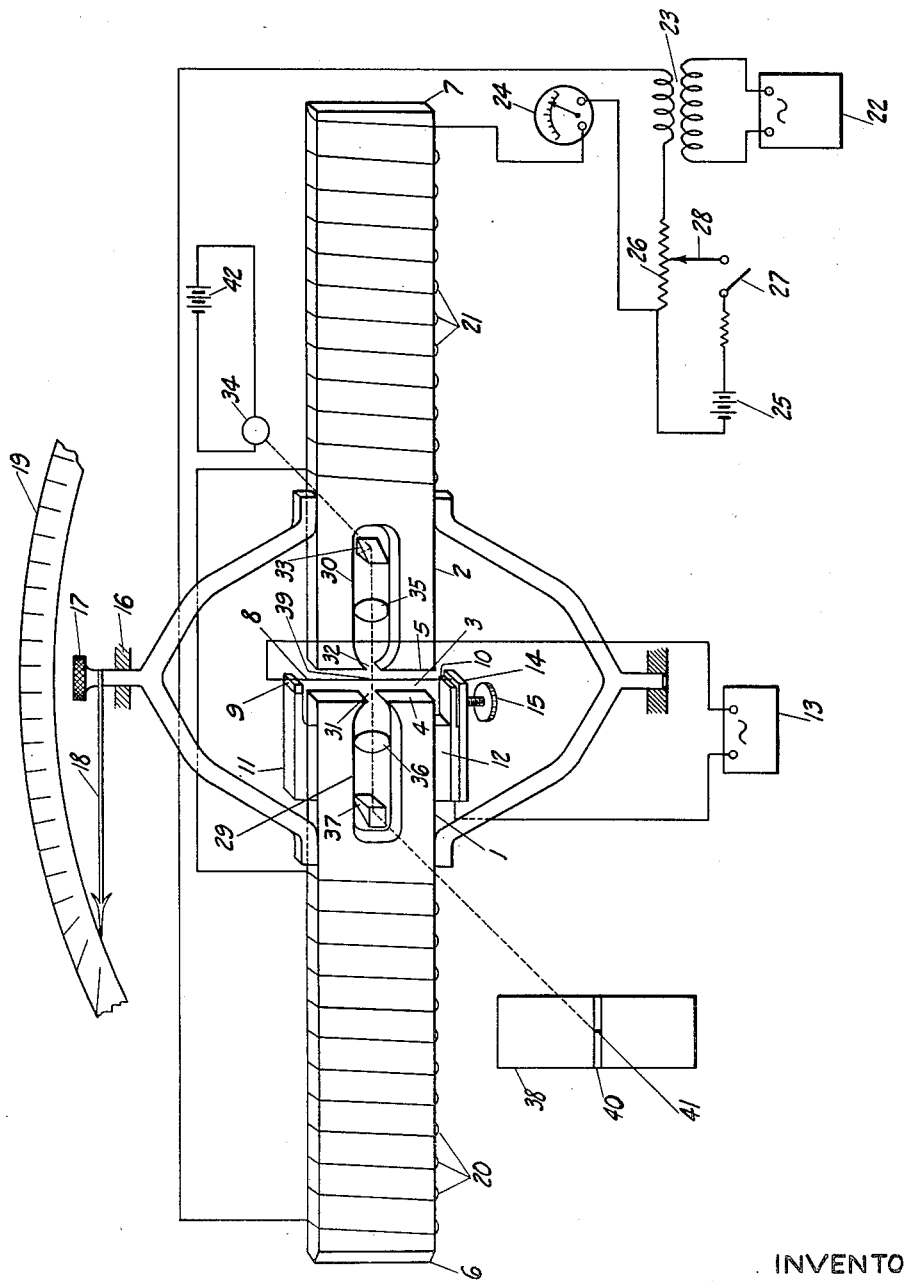
INVENTOR
Frank Rieber
BY John Flam
HIS ATTORNEY Patented June 14, 1932

1,863,415

UNITED STATES PATENT OFFICE

FRANK RIEBER, OF SAN FRANCISCO, CALIFORNIA, ASSIGNOR TO GENERAL ELECTRIC COMPANY, A CORPORATION OF NEW YORK

MAGNETOMETER

Application filed January 4, 1928. Serial No. 244,507.

This invention relates to a device that responds to magnetic fields, and that can be used, for example, to measure the direction and intensity of fields, or to provide a controlling function in accordance with variations in such fields, as for automatic steering of marine vessels or aircraft.

The most common form of instrument that responds to magnetism of low values is the ordinary compass needle. Another type is the magnetic balance. In each permanent magnets are used. However, the compass needle is inherently inaccurate, for the moment acting on the needle is very small; and if it be made long enough to produce a large turning couple, its mass is more susceptible to extraneous influences, such as variations in temperature. Furthermore, its strength and position are affected by mechanical vibrations and shocks; and its position must often be calculated as the mean position of its swing. It is also liable to vary the location of its poles, so that its indications vary accordingly. Furthermore, the bearings and suspensions of both the compass needle and the balance must be very carefully protected, and are so delicate as to require extreme care in transportation.

Another type is the so-called induction compass, in which a coil is rotated in the field that is under test. When the axis of rotation of the coil is parallel with the field, no electromotive force is induced therein, and this is taken as an indication of direction. In this form of compass, limitations on its accuracy are imposed, due to the need of accurately machined bearings; also, the rotation of the coil has a tendency to deform it. Furthermore, since the rotation is necessarily high, the moving parts tend to shake or vibrate the supporting standard, interfering with the reliability and accuracy of the apparatus.

With the aid of my invention, all these difficulties are overcome. There is but one moving part, which requires no extreme care in construction or treatment. The device can be easily made accurate yet rugged in construction. It can be used to indicate either direction or strength of the field measured.

In carrying my invention into effect, I employ a magnetic member possessing a high degree of permeability, together with magnetic responsive means for indicating the amount of flux induced therein by the magnetic field with respect to which indications are desired.

In the particular form of instrument in which I have chosen to illustrate my invention, I utilize the motive effect of the field under consideration upon a current carrying conductor. Thus all that is required to observe is the condition of motion of the conductor; when it is at rest, it is an indication that no field exists transverse to the conductor. Thus this form of instrument depends upon dynamic effects of the field, instead of the inducing effects heretofore utilized.

The apparatus can also be obviously used to measure weak currents, in a manner to be explained hereinafter.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a diagram of one embodiment of my invention.

In this embodiment, the magnetic field under consideration is used in connection with a magnetic structure made from an alloy of high permeability, such as well-known compositions of iron and nickel. It is well known that these nickel-iron alloys possess the properties of low retentivity and low coercive force. Such a structure is shown by the two bars 1 and 2 spaced end to end to form a small air gap 3 between the end faces 4 and 5. The opposite ends of bars 1 and 2 are pointed as shown at 6 and 7 in order accurately to localize the poles formed at these ends.

A conductor 8 is located in the gap in such position that it is transverse to the axis of bars 1 and 2. It is evident that if a current be sent through wire 8, and if a field exists in gap 3, then this wire will be urged in one or the other direction at right angles both to the field and its axis. Preferably the conductor 8 is fastened at its ends so that it is influenced to vibrate when supplied with alternating current of low frequency. For this purpose, wire 8 is fastened at its upper end to a block 9, and at its lower end, to a block 10. These are respectively supported on blocks 11 and 12 fastened in turn to a supporting structure, such as bar 1. The wire 8 is accurately spaced in gap 3 so that it is truly perpendicular to the axis of bars 1 and 2, and is shown as connected to a source of low frequency oscillations 13.

The vibrations of the wire, due to the existence of a field, of course keep in step with the alternations of the current supplied to it from source 13. However, I prefer to tune the wire mechanically so that its amplitude will be increased. This can be accomplished for example by the aid of a rigid member 14 supported under block 10, and an adjusting screw 15 threaded in this member and engaging the overhanging end of the block 9. The tension on wire 8 can be adjusted within useful limits in this fashion.

In order to provide an indication of direction, the magnetic structure can be rotated about a support, such as shown diagrammatically at 16, 17. In employing this device to determine the direction and strength of the horizontal component of the terrestrial field, i. e., in utilizing the device as a compass, it is important that the vertical component of the earth's field should be prevented from inducing magnetism longitudinally of the permeable members 1 and 2 in order to eliminate the erroneous indications that would otherwise result therefrom. To this end, the permeable bars 1 and 2 are supported as shown in the drawing so that they may be rotated about an axis which is maintained vertical. This adjustment may be made by turning the knurled knob 17. With the permeable members 1 and 2 thus confined to a horizontal plane, the vertical component of the earth's field is always at right angles with the longitudinal axis of these members. Consequently no flux is induced longitudinally of these members by the vertical component and errors due to this source are eliminated from the indications. The bars 1 and 2 will thus be subject only to the influence of the horizontal component of the terrestrial field, and the amount of magnetism induced longitudinally of the bars when occupying a position in an east-west (magnetic) plane will be zero. For other positions the induced flux will be directly proportional to the sine of the angle by which the longitudinal axis of the bars is caused to deviate from this east-west plane, and the magnitude of the flux so induced will thus be a true measure of the angular relationship existing between the longitudinal axis of the bars and the N-S direction of the horizontal component of the terrestrial field. When the vibrations of the wire 8 cease, it is known that the bars 1, 2 are exactly at right angles to the axis of the field; a pointer and scale 18, 19 can be utilized to mark this position. When utilized to indicate the direction of the earth's field, the cessation of vibrations of the wire 8 indicates that the longitudinal axis of the bars 1 and 2 lies in an east-west plane, i. e., that the bars are perpendicular to the north-south axis of the earth's field.

In order to ensure that there be no residual effects due to the induction of magnetism in bars 1, 2, I preferably provide a weak alternating field for these bars, just strong enough to overcome the residual magnetism, and so rapidly alternating as not to affect wire 8. For this purpose, I provide the exciting coils 20, 21 on bars 1, 2, connected to a source 22 of rapidly alternating current. In the present instance, the oscillator 22 is shown as transferring its energy through a transformer 23 to the windings 20, 21.

It is desirable at times not only to obtain the direction but the strength of the field also. To do this, the structure is turned until the vibrations of wire 8 are of maximum amplitude, the wire 8 being of course tuned by screw 15 to be resonant with the alternations of source 13. The maximum amplitude indicates that bars 1, 2 are parallel with the field to be measured. Then a direct current excitation is provided for bars 1, 2 just sufficient in amount and direction to nullify the field therein, as shown by the wire 8 coming to rest. The value of the excitation thus provided is a correct measure of the strength of the field.

The direct current excitation can readily be provided by the aid of coils 20 and 21 by merely superposing in the circuit of these coils, a measurable direct current. For this purpose, an accurate direct current galvanometer 24 is provided in the coil circuit, and a source 25 of direct current is arranged to provide any desired excitation within the range of measurement. This can be accomplished for example by shunting any desired portion of a resistance 26 in series in the coil circuit by the source 25. A switch 27 controls the connection of the source 25 to the coil circuit. The variable contact 28 if moved to the left on resistance 26 reduces the direct current excitation; if moved to the right, it increases the excitation. This contact is moved until a position is found when wire 8 ceases its vibrations. Then the reading of galvanometer 24 is noted, and from it can be deduced the strength of the field existing in the locality where bars 1 and 2 are placed.

In order to facilitate observation of wire 8, I provide an optical lens system. Thus bars 1 and 2 can be recessed, as shown at 29 and 30. These recesses have openings 31 and 32 in faces 4 and 5 to permit the passage of light between the recesses. In recess 30 can be located a reflector or its equivalent, such as prism 33 that receives light from lamp 34 and transmits it in a direction parallel with the axis of bars 1, 2. A lens 35 focuses the light upon wire 8, and this light is received by lens 36, in recess 29. Thence the light is bent as by prism 37 onto a screen 38. The wire 8 crosses the path of the light at its midpoint 39. The image of lamp 34 is cast upon screen 38 as a bright zone 40, and crossing this zone is the shadow 41 of wire 8. When the wire vibrates, this shadow broadens. Lamp 34 can be energized from a source 42.

The manner of use of my invention is evident from the foregoing description. To measure direction, the device can be placed axial with the field that is to be measured, by noting when the tuned wire 8 has the largest amplitude. However, it is preferable to secure a null reading, it being more critical, by turning the mechanism until the vibrations cease. The axis of the bars 1, 2 is then at right angles to the direction of the field.

To measure the value of the field, the axis is moved to a position in which the wire 8 vibrates to a maximum extent; then contact 28 is varied until the vibrations cease, and the reading of galvanometer 24 can be taken as an indication of field strength.

Although the instrument shown and described depends for its operation upon the dynamic or kinetic effect between the field to be measured, and a conductor carrying current, I would have it understood that the above description and the drawing are to be interpreted as merely illustrative and not at all in a limiting sense, since modifications and alterations will readily suggest themselves to persons skilled in the art without departing from the true spirit of this invention or the scope of the annexed claims.

I claim:

1. In a magnetometer, a permeable member having high permeability such that a substantial amount of magnetism is induced therein by a magnetic field of substantially the strength of the earth's field, means mounting said member in the field under test so that magnetism is induced therein by said field, and means for conducting current past the face of said member whereby a dynamic effect is obtained between the current and the magnetism induced in said member by said field.

2. A magnetometer having a bar of high permeability so as to be capable of being highly magnetized by weak magnetic fields of the order of the earth's magnetic field, a conductor extending transversely of the bar, means for supplying said conductor with current so as to cause it to move under the influence of the magnetism of said bar, means mounting said bar in the earth's field, and means for orienting said bar in said field so as to influence said conductor with a magnetism dependent upon the position of said bar in said field.

3. A magnetometer comprising an elongated magnetic member having high permeability and low retentivity so as to have induced therein by a field of the strength of the earth's field magnetism substantially proportional to the position of said member in said field, a conductor arranged in cooperative relationship with said member so as to be influenced by the magnetism thereof, means for supplying an alternating current to said conductor, and means for orienting said bar about an axis transverse thereto and in a predetermined plane in a magnetic field so as to influence said conductor with a magnetism proportional to the angular relationship between the longitudinal axis of said member and the direction of a component of said field whereby to cause said conductor to vibrate with an amplitude proportional to said last-mentioned magnetism.

4. A magnetometer comprising an elongated magnetic member having high permeability such that said member is substantially magnetized by a field of the strength of the earth's field, a conductor arranged in cooperative relationship with said member so as to be influenced by the magnetism thereof, means for supplying a periodically varying current to said conductor, means mounting said member for orientation in the earth's field so as to influence said conductor and to cause it to vibrate with an amplitude dependent upon the angular relationship between an axis of said member and the direction of said field, and means comprising a source of rapidly alternating current and a winding on said member and supplied from said source continuously during the operation of said magnetometer for neutralizing the residual magnetism of said member during orientation thereof.

5. A magnetometer comprising an elongated magnetic member having high permeability such that a substantial amount of magnetism is induced therein by the earth's field, a conductor arranged in cooperative relationship with said member so as to be influenced by the magnetism thereof, means for supplying a periodically varying current to said conductor, means mounting said member for orientation in the earth's magnetic field about an axis transverse to the longitudinal axis of said member so as to influence said conductor and to cause it to vibrate with an amplitude dependent upon the angular relationship between the longitudinal axis of said member and the direction of said field, and means providing for observation of the vibration of said conductor.

6. In a magnetometer, a conductor, an elongated member of magnetic material adapted to be magnetized by the field under measurement and to influence said conductor, means for supplying a periodically varying current to the conductor to cause it to vibrate under the influence of the member, and means for orienting the magnetic member in any desired direction about an axis transverse to its longitudinal axis.

7. In a magnetometer, a pair of elongated permeable magnetic bars spaced end to end to form an air gap, arranged with their longitudinal axis in substantial alignment and to be influenced by the field under test, to provide a magnetic flux in said air gap proportional to the relative angular positions of the longitudinal axis of said bars and an axis of said field, a conductor stretched across the air gap at right angles to the axis of the bars, and means for passing current through the conductor.

8. A magnetometer comprising a pair of elongated magnetic bars arranged end to end in spaced apart relationship to form an air gap and with their longitudinal axes in substantial alignment, a conductor stretched across said air gap transversely to the longitudinal axes of said bars, means mounting said bars in the earth's magnetic field so as to be influenced thereby, said bars having high permeability so as to provide a path of low reluctance for the earth's field and to cause a magnetic flux to cross said air gap and influence said conductor, means for passing a varying current through said conductor to cause it to vibrate under the influence of said flux, and means for mechanically tuning said conductor to cause it to vibrate strongly.

9. A magnetometer comprising a pair of elongated magnetic bars having high permeability such that a substantial magnetic flux is induced therein by a field of substantially the strength of the earth's field, said bars being arranged end to end in spaced apart relationship to form an air gap and with their longitudinal axes in substantial alignment, a conductor arranged in said air gap transversely to the longitudinal axes of said bars, means for supplying a periodically varying current to said conductor to cause it to vibrate under the influence of magnetism, means mounting said bars for orientation about an axis transverse thereto in a predetermined plane in the earth's magnetic field, and means comprising a source of low intensity rapidly alternating current and a winding on said bars supplied from said source continuously during the operation of said magnetometer for annulling the residual magnetism of said bars.

10. A magnetometer comprising a pair of magnetic bars spaced end to end to form an air gap, said bars being arranged to be influenced by the field under test, a conductor mounted in said air gap transversely to the axes of said bars so as to be influenced by the magnetism of said bars, means for passing current through said conductor to cause it to vibrate under the influence of magnetism, means for opposing the magnetism induced in said bars by the field under test, and means for measuring the opposing force of said last mentioned means so that the excitation necessary to effect a predetermined reduction in the vibration of said conductor can be determined.

11. In a device for measuring a magnetic field, means including an elongated magnetic member for intensifying the effect of the magnetic field, a conductor arranged in said field in cooperative relationship with said member and vibrating in response to the magnetism thereof, means for supplying current to said conductor and means including prisms carried by said member providing for observing the vibrations of said conductor.

12. A device for determining the direction of the earth's magnetic field comprising a magnetic responsive device, a highly permeable magnetic member arranged to have a magnetic flux induced therein by the earth's field, said induced flux varying with the angular relationship of said member relative to the direction of the earth's field and means mounting said magnetic responsive device in cooperative relationship with said member so as to be influenced by said flux.

13. A device for determining the direction of the earth's magnetic field comprising an elongated magnetic member having high permeability such that a substantial magnetic flux is induced therein by the earth's field, a magnetic responsive device, means mounting said magnetic responsive device in cooperative relationship with said member so as to be influenced by the flux induced therein, and means mounting said member for orientation about an axis transverse thereto and in a plane substantially at right angles with said axis so that said member influences said magnetic responsive device with a magnetic flux proportional to the angular relationship between the longitudinal axis of said member and the direction of a component of the earth's field parallel to said plane.

14. A compass comprising a pair of elongated magnetic members having high permeability arranged with their longitudinal axes in substantial alignment for concentrating the earth's field in the vicinity thereof, said members being spaced apart to provide an air gap, a magnetic responsive device, means mounting said device in said air gap so as to be influenced by said concentrated field, and means mounting said members for orientation about an axis transverse thereto so as to influence said device with a magnetic field proportional to the angular relationship between the longitudinal axis of said members and the direction of the earth's field.

In testimony whereof I have hereunto set my hand.

FRANK RIEBER.